2 Sheets—Sheet 1.

F. BRAMER.

HARVESTER.

No. 7,539. Reissued Feb. 27, 1877.

WITNESSES

C. Clarence Poole

Wm. A. Stinkle

INVENTOR

Frank Bramer.

By his Attorneys

Baldwin Hopkins & Peyton

N. PETERS, PHOTO-LITHOGRAPHER, WASHINGTON, D. C.

2 Sheets—Sheet 2.

F. BRAMER.

HARVESTER.

No. 7,539.

Reissued Feb. 27, 1877.

WITNESSES

C. Clarence Poole

Wm A. Stinkle

INVENTOR

Frank Bramer.

By his Attorneys.

Baldwin, Hopkins & Peyton

N. PETERS, PHOTO-LITHOGRAPHER, WASHINGTON, D. C.

UNITED STATES PATENT OFFICE.

FRANK BRAMER, OF LITTLE FALLS, NEW YORK.

IMPROVEMENT IN HARVESTERS.

Specification forming part of Letters Patent No. 51,546, dated December 19, 1865; reissue No. 7,539, dated February 27, 1877; application filed January 18, 1877.

*To all whom it may concern:*

Be it known that I, FRANK BRAMER, formerly of Fabius, in the county of Onondaga and State of New York, but now residing at Little Falls, in the county of Herkimer, in said State, have invented certain new and useful Improvements in Harvesting and Mowing Machines, of which I hereby declare the following to be a full, clear, and exact description, reference being had to the accompanying drawings, and to the letters of reference marked thereon, making part of this specification, in which drawings—

Figure 2:
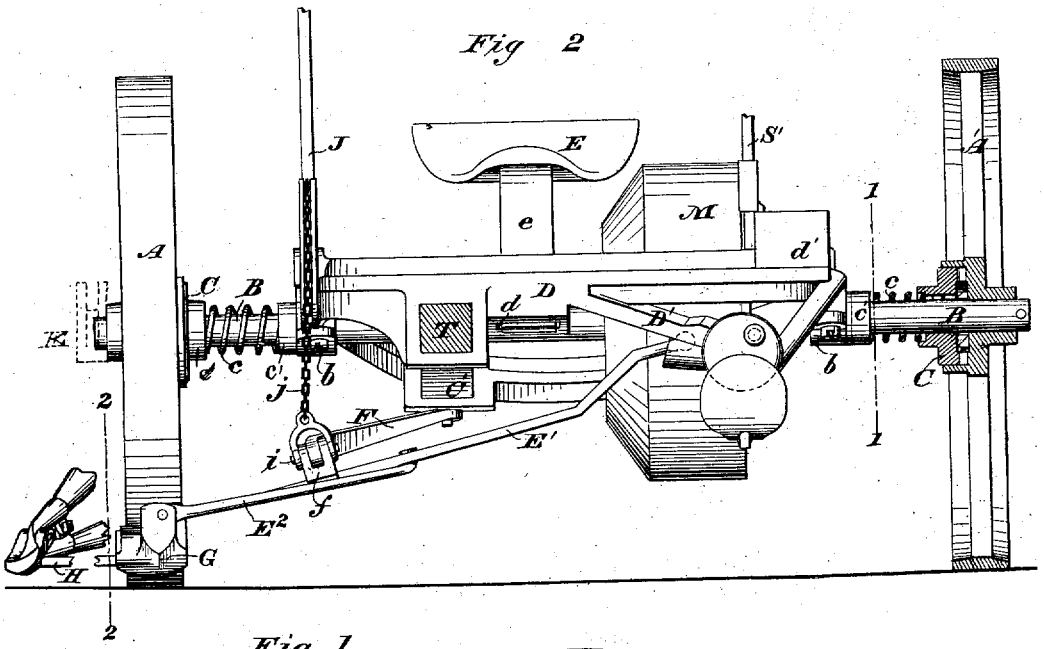
Figure 1:
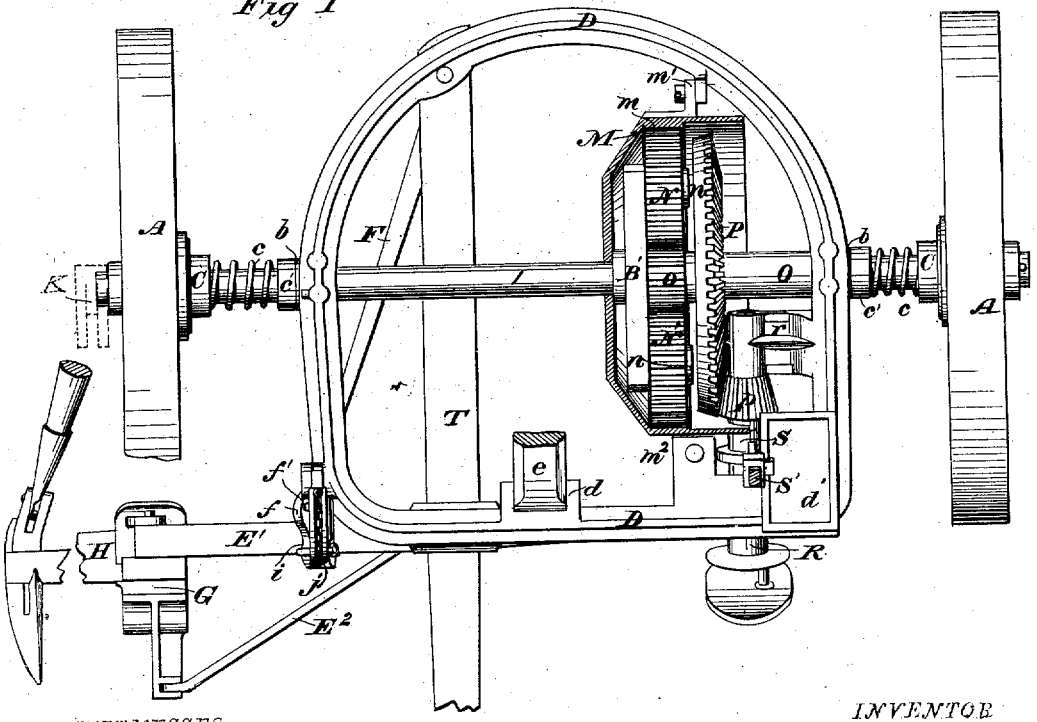
Figure 3:
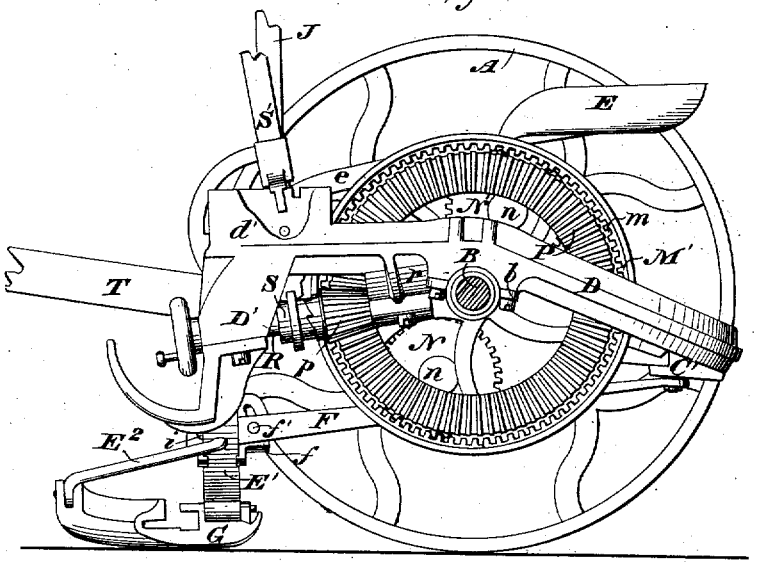
Figure 4:
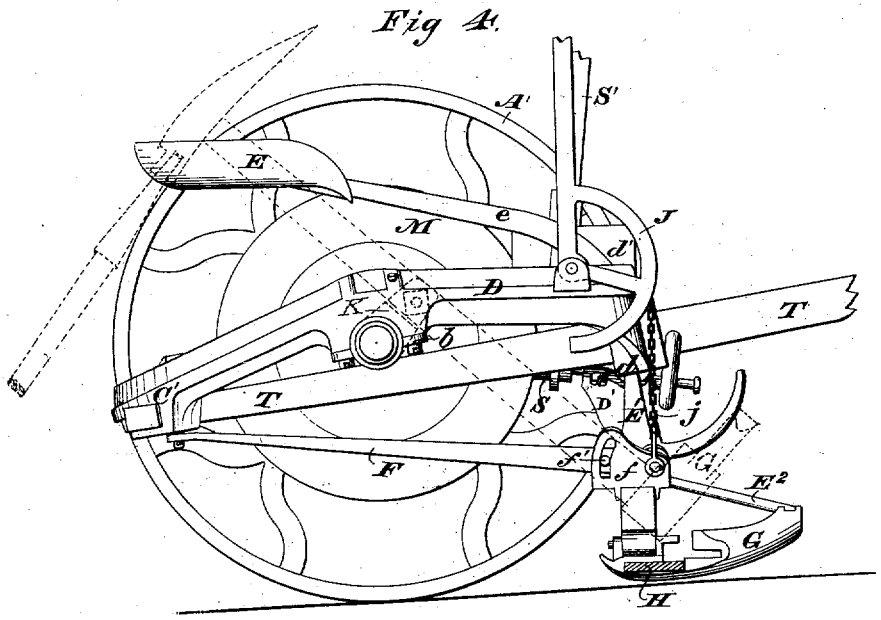

Figure 1 represents a plan or top view of so much of a mowing-machine embracing my improvements as is necessary to illustrate the invention herein claimed, with the gear-casing broken away to show the mechanism within. Fig. 2 represents a view in elevation of the machine, as seen from the front, with one of the driving-wheels in section, to show the details of the backing-ratches. Fig. 3 represents a vertical transverse section through the main axle on the line 1 1 of Fig. 2, looking toward the cutting apparatus. Fig. 4 represents a similar section on the line 2 2 of Fig. 2, looking toward the machine.

My invention more especially relates to that well-known class of harvesting-machines known as two-wheeled front-cut hinge-joint mowers, in which a high main frame, or one essentially on a level with the axle of the driving-wheels, is provided with a stiff tongue, attached to said main frame, to which latter the cutting apparatus is connected by hinged coupling-arms or thrust-bars, pivoted or jointed at one end to the frame, and at the other to the cutting apparatus, in such manner that the cutting apparatus is capable of rising and falling freely at either end, to conform to undulations of the surface over which it glides, while its finger-beam is capable of rocking axially, in order to vary the angle of inclination in conforming with the surface of the ground; is capable of being raised and lowered by the driver from his seat, and of being folded upon the machine, to facilitate transportation from place to place.

The objects of my invention are to diminish the pressure and consequent friction of the cutting apparatus upon the ground; to brace it securely, while allowing it to rise and fall freely; to enable it to rock freely upon its hinges; to facilitate its folding upon the main frame for transportation; to relieve the main frame from twisting-strains; to provide means for supporting the cutting apparatus upon the main axle when folded for transportation; to secure a compact arrangement of gearing; means for securing its accurate and easy working, and of protecting it from dust, dirt, and other clogging matter, which ends I attain in the manner hereinafter described.

The subject-matter claimed will hereinafter specifically be designated, merely premising here that I do not broadly claim attaining these results, but only special organizations of mechanism which produce them.

In the accompanying drawings, two main driving and supporting wheels, A A′, are shown as turning freely on an axle, B, which, in turn, revolves in bearings *b* in the main frame, each wheel being provided with a backing-ratchet, as usual, the backing-ratchet shown consisting of a clutch, C, movable freely endwise upon the shaft, but turning therewith by means of the usual slot and pin or spline, and being normally held in contact with the ratchet on the driving-wheel by a coiled spring, *c*, abutting against a shoulder, *c′*, on the axle, just outside of the bearing of the driving-wheel. The main frame D is of metal, cast in one piece, with a horizontal flange, and a vertical strengthening-rib, as shown, for the purpose of combining strength or stiffness with lightness, that portion of the frame in front of the axle being substantially horizontal, while the portion in rear of the axle declines downward and backward at an angle of about fifteen degrees, for a purpose hereinafter explained. A socket, *d*, is formed in the front of the frame for the reception of a standard, *e*, which supports the driver's seat E. A tool-chest, *d′*, is cast with, and forms a part of, the frame. A down-hanger or bracket, D′, on the outer front corner of the frame, forms one of the bearings for a crank-shaft, as hereinafter explained, and also for a coupling-arm, E′, the upper end of which is connected therewith by a ball-and-socket joint, which allows the coupling-arm to play freely vertically, as well as to rock axially in its socket.

A longitudinal brace or thrust bar, F, is pivoted to the rear of the main frame by a loose joint, which allows both lateral as well as vertical play, while its front end is pin-jointed at *i* to the lug *f* on the coupling-arm, intermediate of its length, while the lower end of this coupling-arm is pin-jointed to the rear end of the shoe G. A brace-rod, $E^2$, secured to the coupling-arm, extends in front thereof, and is pin-jointed to the toe of the shoe substantially concentrically with the pivot of the coupling-arm. A finger-beam, H, is secured to this shoe in usual well-known ways.

By this mode of connection it will be seen that the finger-beam is free to rise and fall at either end, and to rock axially with the coupling-arm.

A plate, *f*, is fixed upon the coupling-arm or swing-bar $E^1$. The plate and the coupling. arm both rock upon a pivot-pin, *i*, passing through the plate or lugs *f* and the front end of the thrust-bar F, above and in front of the bar $E^1$, and above the plane of the shoe G, by which mode of construction the shoe and coupling-arm $E^1$ are free to rock on their longitudinal axis, to ride over slight undulations in the ground, but the tendency of the backward thrust caused by the friction of the cutting apparatus upon the ground, as the machine moves forward, is to keep the points of the guards depressed and thus cut close to the surface of the ground. A set-screw, *f'*, on the thrust-bar, working in a slot in the back of the lugs *f*, maintains the guards at any fixed angle of inclination, when desired, by clamping the lugs *f* and the bar F together.

A lifting-chain, *j*, connected with the pivot *i*, at one end, and passing over the usual lifting-lever J, enables the driver readily to raise and lower the cutting apparatus, or to hold it at any desired elevation.

When it is desired to support the cutting apparatus upon the driving-wheels clear of the ground, as when transporting it from field to field, the divider end is elevated until the finger-beam is perpendicular, when it is rocked backward on the pivot, into the position shown by the dotted lines in Fig. 4, where it lies parallel with the driving-wheel, being secured in a rest or slotted plate, K, secured loosely upon the outer end of the axle, and provided with a groove in its projecting end of proper size to receive the back end of the cutter-bar, which may be secured in place by a pin passing through holes in the cutter-bar and rest.

A hollow drum, M, provided with an internal spur-gear, *m*, Fig. 3, surrounds the main axle B, and is secured upon the frame by means of flanges $m^1$ $m^2$, Fig. 1, and bolts taking into corresponding lugs on the frame, whereby I am enabled to adjust the drum either vertically or horizontally, thus securing the drum concentrically upon the main axle, and at right angles thereto, which position is absolutely necessary to insure the proper working of the gearing.

A cross-bar, B', rigidly secured upon and turning with the main axle B, is provided with stud-axles *n*, upon which are mounted planet-wheels N N', which wheels gear upon one side, with the fixed annular gear *m*, and on the other with the spur-pinion *o* mounted upon a sleeve, O, revolving loosely upon the main axle between them. A bevel-gear, P, also secured upon and revolving with this sleeve, drives a corresponding pinion, *p*, on a crank-shaft, R, mounted at its rear end upon a bracket or down-hanger, *r*, secured underneath the main frame, while its front end has its bearing in a hanger, D', on the main frame above mentioned.

As the machine moves forward the cross bar or arm B' revolves with the main axle, carrying its spur-gears with it, as usual with planetary gearing, thus imparting a rapid motion to the cutters, which are driven by a crank and pitman in a well-known way.

The crank-shaft is thrown out of gear by means of a sliding clutch, S, and lever S', of ordinary construction. (Shown in Fig. 3.)

The open end of the drum M is closed by a wooden or metal cover, so as to inclose all the gearing, except the bevel-pinion *p*, and thus protect the gearing from dust, grit, &c.

The tongue T passes through the stirrup or box on the under side of the main frame, its rear end being secured in a socket, C', formed in the depressed rear end of the main frame for that purpose.

It will be seen that by this method of attaching the tongue underneath the frame, the line of draft is thrown below the main axle; consequently the tendency of the draft is to draw down the rear end of the frame, correspondingly elevating the front thereof, and thus relieve the team from downward pressure of the tongue.

I claim as of my own invention—

1. The combination, in a front-cut harvester, of the main frame, the stiff tongue, the rocking double-hinged coupling-arm, and the push-bar, hinged at its front end to said coupling-arm, and pivoted at its rear end to the main frame, these members being constructed and operating in combination, substantially as hereinbefore set forth.

2. The combination, in a front-cut harvester, of two main supporting and driving wheels, a main frame mounted thereon, a stiff tongue secured to the main frame, a finger-beam and shoe connected with the main frame by an axially-rocking double-hinged coupling-arm in front of and parallel with the main axle, and a push-bar pivoted in rear to the frame, and hinged in front to the rocking coupling-arm, these members being constructed and operating in combination, substantially as hereinbefore set forth.

3. The drum, constructed as described, with a vertical and a horizontal flange, in combination with corresponding flanges on the main frame, whereby the drum may be adjusted concentrically upon the main axle, and at right angles thereto.

4. The slotted finger-bar rest K, constructed as shown, and secured to one end of the main axle, to hold the cutter-bar when folded for transportation.

FRANK BRAMER.

Witnesses:
WM. D. BALDWIN,
WM. J. PEYTON.